United States Patent
Bächer et al.

Patent Number: 6,151,580
Date of Patent: Nov. 21, 2000

[54] AUDIO PLAYBACK APPARATUS

[75] Inventors: Dieter Bächer, Sexau; Juergen Becher, Emmendingen; Juergen Meiner, Freiburg i. Br., all of Germany

[73] Assignee: Micronas Intermetall GmbH, Freiburg, Germany

[21] Appl. No.: 09/251,502

[22] Filed: Feb. 17, 1999

[30] Foreign Application Priority Data

Feb. 19, 1998 [EP] European Pat. Off. .............. 98102921

[51] Int. Cl.$^7$ .............................. G10L 21/04; H04N 5/70
[52] U.S. Cl. .............................. 704/500; 704/503; 360/54
[58] Field of Search .................................... 704/500, 501, 704/503; 360/54; 369/44.31

[56] References Cited

U.S. PATENT DOCUMENTS

| | | | |
|---|---|---|---|
| 4,348,699 | 9/1982 | Tsuchiya et al. | 360/32 |
| 5,428,593 | 6/1995 | Kanai et al. | 369/59 |
| 5,894,480 | 4/1999 | Hoffert et al. | 370/389 |
| 5,902,115 | 5/1999 | Katayama | 434/307 A |

FOREIGN PATENT DOCUMENTS

| | | |
|---|---|---|
| 0165320 | 12/1985 | European Pat. Off. . |
| 0543667 | 5/1996 | European Pat. Off. . |
| 19722466 | 12/1997 | Germany . |
| 9630906 | 10/1996 | WIPO . |

OTHER PUBLICATIONS

Copy of EP Search Report for EP 98 10 2921, dated Jul. 21, 1998.

*Primary Examiner*—Richemond Dorvil
*Assistant Examiner*—Daniel Abebe
*Attorney, Agent, or Firm*—Arthur L. Plevy; Buchanan Ingersoll PC

[57] ABSTRACT

An audio playback apparatus for an input data stream (d0) delivered by an audio data source (1) in a standardized data format (F1) is disclosed comprising an input decoder (2) for forming a first data stream (d1), which contains the audio information and is separated by means of an output decoder (5) into its audio signal components (L, R). In addition to the first data stream (d1), the input decoder (2) generates a second data stream (d2) which corresponds to the data contained in the data field (D1) of the standardized data format (F1), and which is fed to an additional decoder (3) that detects a second data format (F2) possibly contained in the second data stream (d2) and passes the audio information of the second data format (F2) as a third data stream (d3) to the output decoder (5). Upon detection of the second data format (F2), the additional decoder (3) provides a detection signal (dz) to the control unit (4) which, in response to this detection signal (dz), sets the output decoder (5) to the processing of the first or third data stream (d1, d3).

20 Claims, 1 Drawing Sheet

AUDIO PLAYBACK APPARATUS

FIELD OF INVENTION

The present invention relates to audio playback and more particularly to an improved apparatus therefore.

BACKGROUND OF INVENTION

This invention relates to an audio playback apparatus for an audio data source, such as a compact disk ("CD") which contains, in a standardized data format, audio information that is read, decoded, and separated into the individual signal components. The further processing circuitry, such as tone and volume control circuits, is generally located in a separate output amplifier but may also be contained in the audio playback apparatus, particularly if the latter is a small, portable pocket device for example. The data read from the CD, or other source for that matter is fed to an input decoder which performs an error correction by means of an error-checking code and feeds the corrected data stream to an output decoder which separates the data stream into the respective audio signal components, such as the left and right signals.

It is to be recognized that the audio data source is not limited to the CD mode, as other audio data sources are known whose data are delivered in a standardized data format. Such audio data sources can be accessed via the Internet, for example.

At the receiver end, this data is then stored on the hard disk in the PC or on any other suitable device, for example, an external or removable data carrier. CDs are reasonably priced devices for storing audio data, which have gained additional attraction by being rewritable ("burning"). To permit the use of commercially available audio playback apparatus, the data must be stored according to submitted standards, for example according to the "Sony-Philips Red/Blue Book".

The transmission, storage, and reproduction of audio data in accordance with these standardized data formats is very common. However, it has the disadvantage that these data formats do not provide for data compression and, at least in this respect, are inferior to more recent methods. There are methods in which the level of compression can be chosen in a wide range. Pure voice applications allow a higher compression level than high-quality music reproduction. Such a compression and coding method is known by the acronym "MPEG". The existing data compression methods should be utilizable during recording and reproduction without any basic changes having to be made to the system. For example, a CD player is desirable which can play back conventional audio CDs, CDs with source-coded data, and mixed-code CDs.

It is therefore a main object of the invention to improve an audio playback apparatus in such a way that it can process audio information which is assigned to different standardized data formats, and particularly audio information which also permits data compression.

Related objects of the invention are to provide a suitable storage device and an associated programming device for an audio playback apparatus in accordance with the invention.

SUMMARY OF INVENTION

An audio playback apparatus including: an audio data source (1) adapted to provide an input data stream (d0) in a first standardized data format (F1); an input decoder (2) coupled to the audio data source (1) and adapted to provide at least a first data stream (d1) including a data field (D1) from the input data stream (d0) and a second data stream (d2) from the data field (D1); an output decoder (5) coupled to the input decoder (2) and adapted to generate a plurality of audio channels from the first stream (d1); an additional decoder (3) coupled to the input decoder (2) and output decoder (5) and adapted to receive the second data stream (d2) and detect a second standardized data format (F2) therein, and upon detection thereof to generate a third data stream (d3) to the output decoder (5); and, a control unit (4) coupled to the input decoder (2), output decoder (5) and additional decoder (3) and adapted to selectively set the output decoder (5) to the processing of the first or third data stream (d1, d3) responsively to the additional decoder (3).

DETAILED DESCRIPTION OF THE INVENTION

Figure 1:
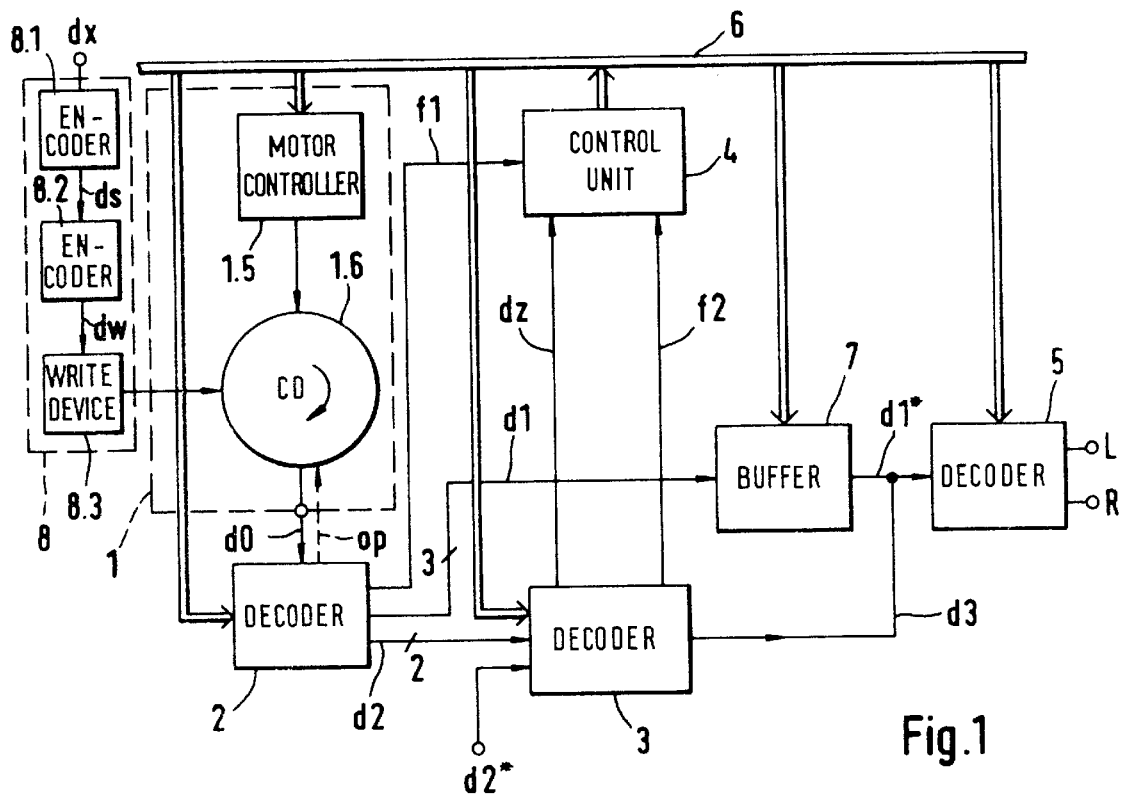
FIG. 1 illustrates a schematic block diagram of an audio playback apparatus; and, FIG. 2 illustrates a time diagram of an interleaved data format.

To attain the main object, the input data stream fed to the audio playback apparatus is formed according to the usual standardized data format, but the data field contains the audio information of the audio data source not directly, but indirectly as a second standardized data format which is contained in the data field of the first standardized data format. To evaluate this interleaved data format, the input decoder has, in addition to a first data output, at which the audio information is provided as a first data stream as heretofore, a second data output at which the data contained in the data field of the standardized data format are provided as a second data stream. This second data stream is fed to an additional decoder which detects at least the second standardized data format and which passes the audio information contained therein to the output decoder as a third data stream. The additional decoder further provides a detection signal to a control unit which sets the output decoder to the processing of either of the data streams in response to this detection signal.

To attain the first related object, the audio data source corresponds essentially to a storage device which contains audio signal data for an audio playback apparatus in a standardized data format in which the data fields of successive data packets contain no audio data, but a further standardized data format which contains the compressed audio data in its data field.

The second related object is attained by providing a programming device for a storage device which places the audio information on the storage device in an interleaved data format, with the two interleaved data formats corresponding to respective standardized data formats. The programming device causes a reversal of the signal processing of the additional and input decoders according to the audio playback apparatus in accordance with the invention. These functional units are followed by the usual write device.

In the MPEG standard, the different compression factors of the second data format are included as information in an auxiliary-data field. The data compression involves a reduction of the data rate of the input data stream. If the audio data source is a storage device, the read clock rate must change in accordance with the compression factor. The use of oversampling during the reading of CDs is of no significance in this connection. In the case of mechanically driven storage devices, such as CDs, the data rate to be read out is adapted to the respective compression factor by controlling the speed of the motor.

To ensure that the output decoder is fed only genuine audio data, it is preferably muted during the switching of the data streams. To shorten these time intervals, temporal compensation is used between the two audio data streams.

The invention and preferred embodiments will now be explained in greater detail with reference to the accompanying drawing, in which like references refer to like elements of the invention.

FIG. 1 shows the individual functional units of an audio playback apparatus according to the invention in block-diagram form. An audio data source 1 delivers an input data current do to an input decoder 2, a first data output of which provides a first data stream d1, which is error-corrected by means of correction data in the usual manner. Since a clock signal and an identification signal are transferred in addition to the data, the data bus for the first data stream d1 preferably has three leads.

According to the invention, the input decoder 2 has a second data output which delivers a second data stream d2 that corresponds to the error-corrected data field D1 of the input data stream d0. Since in addition to these data, a clock signal is transferred to the additional decoder 3, the associated data bus preferably has two leads. The second data stream d2 can also be fed to the additional decoder 3 as an external data stream d2* via a separate terminal. Such a terminal is appropriate, for example, if the audio playback apparatus is connected to, or forms part of, a computer with which audio data sources are accessed via the Internet, for example.

At a third output, the input decoder 2 provides an error signal f1, which is fed to a control unit 4. The additional decoder 3 also provides an error signal f2 to the control unit 4, which can mute an output decoder 5 in response to these error signals f1, f2. The error signals f1, f2 are formed if the associated decoders 2, 3 detect no evaluable data or if the data are so corrupted that correction is no longer possible.

The additional decoder 3 continuously checks the data of the second data stream d2 for the presence of a known data format F2. If it detects such a data format, it sends a detection signal d2 to the control unit 4, signaling that an interleaved data format F1, F2 is present which it can process in accordance with its function. If the additional decoder 3 can detect two or more data formats, the detection signal dz will also include the associated format information for the control unit 4. The latter initiates the necessary switching operations in the audio playback apparatus via a control bus 6. If the audio data source 1 is a mechanically driven playback device, such as a CD drive or a magnetic tape drive, the controller 4 will adapt the speed to the reduced sampling rate via a motor controller 1.5.

The additional decoder 3 supplies the decoded audio data as a third data stream d3 to the output decoder 5. Since the additional decoder 3 follows the input decoder 2, the third data stream d3 is delayed with respect to the first data stream d1. To avoid any excessive interference intervals for the muting in the output decoder 5 during the switching from the first data stream d1 to the third data stream d3 and vice versa, the first data stream d1 is delayed in a buffer 7 by approximately an amount equal to the processing time of the second data stream d2 in the additional decoder 3, forming the data stream d1*. The switching of the first and third data streams d1*, d3 is accomplished either by means of an electronic switch or by tri-state control of the data outputs of the buffer 7 and the additional decoder 3. In the latter case, the data lines can be connected together and be coupled to a single data input of the output decoder 5. The control of the tri-state data outputs is effected by the control unit 4 via the control bus 6.

In the specific embodiment of FIG. 1, the audio data source 1 is shown schematically as a CD player. A rotating compact disk 1.6 is optically scanned by the input decoder 2 and generates the input data stream d0. The optical scanning by the input decoder 2 is indicated by a dashed line op.

The storage device 1.6 in the audio data source 1 should be easily exchangeable. That is the case with the change mechanisms of conventional CD drives and even more if the CD size is reduced. As the storage capacity of solid-state memories increases, however, mechanically driven storage devices are likely to be replaced, at least in some areas, by exchangeable mass storage devices, thus eliminating the need for the relatively complex and trouble-prone mechanical systems.

As the audio data source 1 is assumed to be not only a pure playback device, FIG. 1 shows, in the form of blocks, a programming device 8 which generates the interleaved data format for the storage device 1.6. The programming device 8 contains, in the direction of signal flow, a first encoder 8.1, a second encoder 8.2, and a write device 8.3. The second encoder 8.2 and the write device 8.3 correspond to the functional blocks of commercially available write devices for the standardized data format F1, which are known for CDs by the term "burners". According to the invention, however, the audio data to be stored, dx, are first converted by the first encoder 8.1 to the second standardized data format F2 to form a data stream ds which is fed as a "quasi-audio data stream" to the second encoder 8.2 for conversion to the first data format F1. The resulting data stream dw corresponds to the first standardized data format F1 and is written on the storage device 1.6 by means of the write device 8.3.

The advantage of the invention lies in the fact that the playback apparatus is highly flexible as it can process at least one of the commonly used data formats, but also additional data formats which permit a high level of compression. The playing time of existing storage devices 1.6 can thus be significantly increased. This applies already for recordings of normal or high quality. A further prolongation of the playing time is achieved if a lower quality level is used for recording and reproduction, e.g., for voice recording and voice reproduction. Another advantage is that if individual circuits are to be implemented using monolithic integrated circuit technology, the additional complexity is low, because functions are at least partially executed in a multiplex mode or performed by processors which are not used to capacity.

Figure 2:
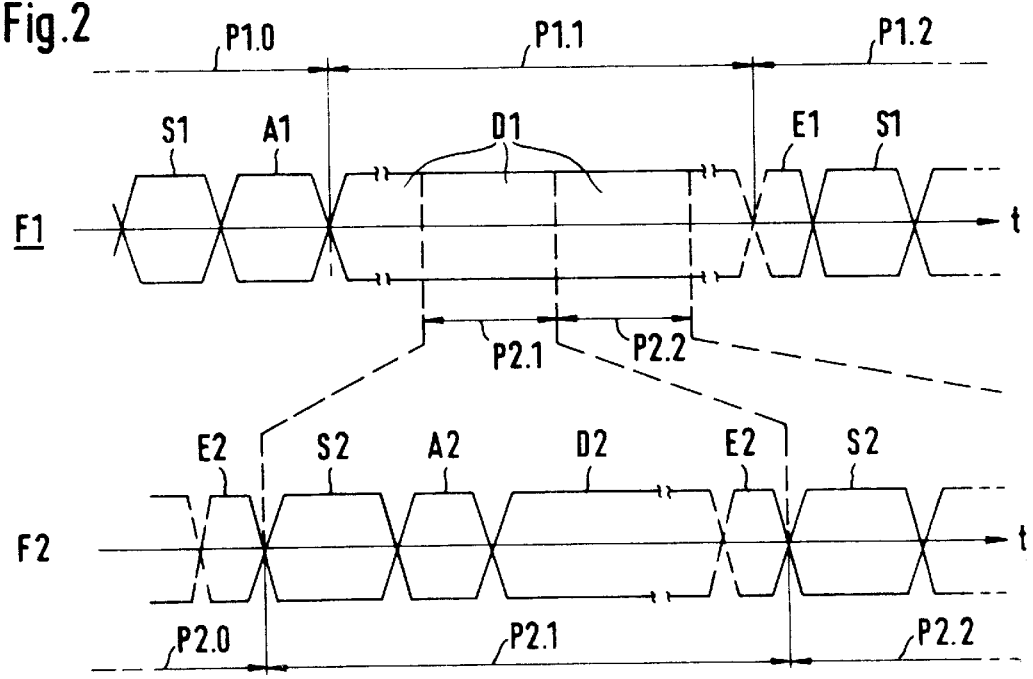

FIG. 2 illustrates a scheme of the interleaved data formats. The first standardized data format F1, which is transmitted in successive data packets P1.0, P1.1, P1.2, contains a sync field S1 for synchronizing the data packets at the receiving end, then an auxiliary-data field A1, which may contain information on the respective data standard, the length of the data format, or other information, then the data field D1, containing the audio data along with an error-correcting code, and finally an end field E1, which signals the end of the respective data format and data packet. This basic data structure, of course, permits deviations in the type and length of the individual blocks etc. Additional fields may be provided, or other fields, which may also recur. The subsequent data packet P1.2 contains the same blocks, i.e., the sync field S1, the auxiliary-data field A1, etc.

The second standard data format F2, which also defines the data structure in the successive data packets, does not basically differ from the structure of the first data format F1. Sync information S2 is followed by auxiliary data A2, which in the case of the MPEG standard, for example, defines the respective compression factor of the audio information contained in data field D2. Here, too, the length of the data packets is specified either in the auxiliary-data field A2 or by the end information E2. The data packet P2.1 is followed by the new data packet P2.2, which has the same structure. The time axis t in the representation of the data format F2 is extended in comparison with that of the representation of the data format F1.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. An audio playback apparatus for an input data stream (d0) delivered by an audio data source (1) in a standardized data format (F1), comprising an input decoder (2) for forming a first data stream (d1) which contains the audio information and is separated into its audio signal components (L, R) by means of an output decoder (5), and a control unit (4), wherein:
the input decoder (2) further includes, in addition to a first data output at which the first data stream (d1) is provided, a second data output at which the data contained in the data field (D1) of the standardized data format (F1) is provided as a second data stream (d2);
the second data output of the input decoder (2) has an additional decoder (3) connected thereto which detects a second data format (F2) possibly contained in the second data stream (d2) and routes the audio information of the second data format (F2) as a third data stream (d3) to the output decoder (5); and
upon detection of the second data format (F2), the additional decoder (3) provides a detection signal (dz) to the control unit (4) which in response to said detection signal (dz) sets the output decoder (5) to the processing of the first or third data stream (d1, d3).

2. The audio playback apparatus as claimed in claim 1, wherein the audio data source (1) comprises a storage device (1.6), particularly an easily exchangeable storage device.

3. The audio playback apparatus as claimed in claim 2, wherein the storage device (1.6) is at least partially driven mechanically.

4. The audio playback apparatus as claimed in claim 3, wherein the read rate of the storage device (1.6) is dependent on a motor speed which is regulated at at least one predetermined value by the control unit (4) via a motor controller (1.5).

5. The audio playback apparatus as claimed in claim 2, wherein the control unit (4) changes the read rate of the storage device (1.6) in response to the detection signal (dz).

6. The audio playback apparatus of claim 1, wherein when detecting no evaluable data or errors in the input data stream (d0), the input decoder (2) and/or the additional decoder (3) generate a first error signal (f1) and/or a second error signal (f2), respectively, which mute the output decoder (5).

7. The audio playback apparatus of claim 1, wherein the first data stream (d1) is fed to a buffer (7) which essentially provides temporal compensation between the first and third data streams (d1, d3).

8. The audio playback apparatus of claim 1, wherein the data outputs of the buffer (7) and the additional decoder (3) are tri-state outputs.

9. The programming device (8) for a storage device (1.6) of an audio playback apparatus of claim 1, comprising a second encoder (8.2) and a write device (8.3) for a first standardized data format (F1), wherein the audio data to be stored (dx) are converted by means of a first encoder (8.1) to a second standardized data format (F2), and that a data sequence resulting therefrom (ds) is fed to the first encoder (8.2) for conversion to the first standardized data format (F1) and forms a ready-to-write data sequence (dw) which is written on the storage device (1.6) by means of the write device (8.3).

10. The storage device (1.6) for an audio playback apparatus of claim 1, wherein the data field (D1) of successive data packets (P1.0, P1.1, P1.2) contains, at least partly instead of audio data, data packets (P2.0, P2.1, P2.2) of at least one further standardized data format (F2), particularly for compressed audio data.

11. An audio playback apparatus comprising:
an audio data source (1) adapted to provide an input data stream (d0) in a first standardized data format (F1);
an input decoder (2) coupled to said audio data source (1) and adapted to provide at least a first data stream (d1) including a data field (D1) from said input data stream (d0) and a second data stream (d2) from said data field (D1);
an output decoder (5) coupled to said input decoder (2) and adapted to generate a plurality of audio channels from said first data stream (d1);
an additional decoder (3) coupled to said input decoder (2) and output decoder (5) and adapted to receive said second data stream (d2) and detect a second standardized data format (F2) therein, and upon detection thereof to generate a third data stream (d3) to said output decoder (5); and,
a control unit (4) coupled to said input decoder (2), output decoder (5) and additional decoder (3) and adapted to selectively set the output decoder (5) to the processing of the first or third data stream (d1, d3) responsively to said additional decoder (3) detecting said second standardized format (F2).

12. The audio playback apparatus of claim 11, wherein the audio data source (1) comprises a data storage device (1.6).

13. The audio playback apparatus of claim 12, wherein the audio data source (1) further comprises means for at least partially mechanically driving said data storage device (1.6).

14. The audio playback apparatus of claim 13, wherein the control unit (4) changes the read rate of the storage device (1.6) responsively to the detection of said second standardized data format (F2) by said additional decoder (3).

15. The audio playback apparatus of claim 14, wherein a read rate of the storage device (1.6) is dependent on a motor speed which is regulated responsively to at least one predetermined value by the control unit (4).

16. The audio playback apparatus of claim 11, wherein said input decoder (2) and additional decoder (3) are further adapted to mute said output decoder (5) when no evaluable data or errors in the input data stream (d0) are found.

17. The audio playback apparatus of claim 11, further comprising a buffer (7) coupled between said input decoder (2) and output decoder (5) and adapted to introduce a temporal compensation between the first and third data streams (d1, d3).

18. The audio playback apparatus of claim 17, wherein data outputs of the buffer (7) and the additional decoder (3) are tri-state outputs.

19. The audio playback apparatus of claim 11, wherein the data field (D1) of successive data packets (P1.0, P1.1, P1.2) contains, at least partly, data packets (P2.0, P2.1, P2.2) of said second standardized data format (F2).

20. A method for playing back digitally encoded data indicative of audio signals comprising the steps of:

forming a first data stream in a first format and including a first data field; and, in a first mode, generating at least one audio signal from said first data stream; and, in a second mode, automatically detecting a second data format in said first data field and including a second data field, and generating said at least one audio signal from said second data field.

* * * * *